(12) United States Patent
Jones et al.

(10) Patent No.: US 11,066,322 B2
(45) Date of Patent: Jul. 20, 2021

(54) SELECTIVELY HEAT-TREATED GLASS-CERAMIC FOR AN ELECTRONIC DEVICE

(71) Applicant: Apple Inc., Cupertino, CA (US)

(72) Inventors: Christopher D. Jones, Los Gatos, CA (US); Matthew S. Rogers, San Jose, CA (US); Que Anh S. Nguyen, San Jose, CA (US)

(73) Assignee: APPLE INC., Cupertino, CA (US)

( * ) Notice: Subject to any disclaimer, the term of this patent is extended or adjusted under 35 U.S.C. 154(b) by 162 days.

(21) Appl. No.: 15/986,778

(22) Filed: May 22, 2018

(65) Prior Publication Data

US 2019/0169060 A1 Jun. 6, 2019

Related U.S. Application Data

(60) Provisional application No. 62/593,564, filed on Dec. 1, 2017.

(51) Int. Cl.
*C03B 32/02* (2006.01)
*H04M 1/02* (2006.01)
*G06F 1/16* (2006.01)

(52) U.S. Cl.
CPC .......... *C03B 32/02* (2013.01); *H04M 1/0266* (2013.01); *G06F 1/1626* (2013.01); *G06F 2200/1634* (2013.01)

(58) Field of Classification Search
None
See application file for complete search history.

(56) References Cited

U.S. PATENT DOCUMENTS

| 2,795,084 A | 6/1957 | Littleton |
| 3,410,673 A | 11/1968 | Marusak |
| 3,433,611 A | 3/1969 | Kubican |
| 3,464,880 A | 9/1969 | Rinehart |
| 3,737,294 A | 6/1973 | Dumbaugh, Jr. et al. |
| 3,746,526 A | 7/1973 | Giffon |
| 3,899,315 A | 8/1975 | Siegmund |

(Continued)

FOREIGN PATENT DOCUMENTS

| DE | 102016107630 | 10/2017 |
| JP | S6271215 | 5/1987 |

(Continued)

OTHER PUBLICATIONS

Moriceau et al., "Overview of recent direct wafer bonding advances and applications," Advances in Natural Sciences: Nanoscience and Nanotechnology, vol. 1, No. 043004, 11 pages, 2010.

(Continued)

*Primary Examiner* — Anthony J Frost
(74) *Attorney, Agent, or Firm* — Brownstein Hyatt Farber Schreck, LLP

(57) ABSTRACT

The embodiments disclosed herein are directed to forming selectively heat-treated glass-ceramic parts for use in an electronic device. In various embodiments, glass-ceramic parts, such as a cover sheet, may have multiple different regions having different objectives for material properties such as optical properties, strength, fracture toughness, hardness, and the like. Different regions may be selectively heat treated to achieve desired results.

6 Claims, 10 Drawing Sheets

(56) References Cited

U.S. PATENT DOCUMENTS

| | | |
|---|---|---|
| 4,209,229 A | 6/1980 | Rittler |
| 5,173,453 A | 12/1992 | Beall et al. |
| 5,273,553 A | 12/1993 | Hoshi et al. |
| 6,055,053 A | 4/2000 | Lesniak |
| 6,067,005 A | 5/2000 | DeVolpi |
| 6,169,256 B1 | 1/2001 | Hanahara |
| 6,809,278 B2 | 10/2004 | Tsubaki |
| 6,928,224 B2* | 8/2005 | Beall ............... C03C 3/085 385/129 |
| 7,115,827 B2 | 10/2006 | Tseng |
| 7,240,519 B2 | 7/2007 | Schwartz et al. |
| 7,459,199 B2 | 12/2008 | Skeen |
| 7,497,093 B2 | 3/2009 | Rosenflanz |
| 7,507,918 B2 | 3/2009 | Kazama |
| 7,799,158 B2 | 9/2010 | Yokoyama et al. |
| 7,902,474 B2 | 3/2011 | Mittleman |
| 7,915,556 B2 | 3/2011 | Ou |
| 8,003,217 B2 | 8/2011 | Rosenflanz |
| 8,050,019 B2 | 11/2011 | Wennemer |
| 8,092,737 B2 | 1/2012 | Chang et al. |
| 8,212,455 B2 | 7/2012 | Yura et al. |
| 8,277,704 B2 | 10/2012 | Matsushima et al. |
| 8,379,159 B2 | 2/2013 | Hsu |
| 8,431,849 B2 | 4/2013 | Chen |
| 8,446,264 B2 | 5/2013 | Tanase |
| 8,783,065 B2 | 7/2014 | Schillert et al. |
| 8,840,997 B2 | 9/2014 | Koyama et al. |
| 8,898,824 B2 | 12/2014 | Neidich et al. |
| 9,001,503 B1 | 4/2015 | Hibino |
| 9,030,440 B2 | 5/2015 | Pope |
| 9,125,298 B2 | 9/2015 | Russell-Clarke |
| 9,134,547 B2 | 9/2015 | McCabe et al. |
| 9,140,522 B1 | 9/2015 | Miller et al. |
| 9,193,625 B2 | 11/2015 | Bookbinder et al. |
| 9,232,672 B2 | 1/2016 | Kwong |
| 9,242,889 B2 | 1/2016 | Yamakaji et al. |
| 9,249,045 B2 | 2/2016 | Gabel et al. |
| 9,263,209 B2 | 2/2016 | Chen |
| 9,302,937 B2 | 4/2016 | Gulati et al. |
| 9,321,677 B2 | 4/2016 | Chang et al. |
| 9,359,251 B2 | 6/2016 | Bookbinder et al. |
| 9,375,900 B2 | 6/2016 | Tsuchiya et al. |
| 9,474,174 B2 | 10/2016 | Motohashi |
| 9,516,149 B2 | 12/2016 | Wright et al. |
| 9,522,836 B2 | 12/2016 | Gulati et al. |
| 9,524,413 B2 | 12/2016 | Kim |
| 9,674,322 B2 | 6/2017 | Motohashi et al. |
| 9,697,409 B2 | 7/2017 | Myers |
| 9,718,727 B2 | 8/2017 | Bookbinder et al. |
| 9,728,349 B2 | 8/2017 | Huang |
| 9,840,435 B2 | 12/2017 | Ohara et al. |
| 9,870,880 B2 | 1/2018 | Zercoe |
| 9,897,574 B2 | 2/2018 | Roussev et al. |
| 9,902,138 B2 | 2/2018 | Edwards |
| 9,902,641 B2 | 2/2018 | Hall et al. |
| 9,941,074 B2 | 4/2018 | Tu |
| 9,946,302 B2 | 4/2018 | Franklin et al. |
| 10,133,156 B2 | 11/2018 | Pilliod et al. |
| 10,141,133 B2 | 11/2018 | Bae |
| 10,146,982 B2 | 12/2018 | Hsu |
| 10,189,228 B2 | 1/2019 | Couillard et al. |
| 10,286,631 B2 | 5/2019 | Alder et al. |
| 10,318,783 B2 | 6/2019 | Kang |
| 10,357,945 B2 | 7/2019 | Beall et al. |
| 2004/0003627 A1* | 1/2004 | Hashima ............ C03C 25/6208 65/33.2 |
| 2005/0176506 A1 | 8/2005 | Goto |
| 2008/0049980 A1 | 2/2008 | Castaneda |
| 2009/0040737 A1 | 2/2009 | Shimura |
| 2010/0108486 A1 | 5/2010 | Yoshida |
| 2010/0148996 A1 | 6/2010 | Wang |
| 2010/0285310 A1 | 11/2010 | Izutani et al. |
| 2011/0038115 A1 | 2/2011 | Halkosaari |
| 2011/0041987 A1 | 2/2011 | Hori et al. |
| 2011/0253520 A1 | 10/2011 | Lim |
| 2012/0052271 A1 | 3/2012 | Gomez et al. |
| 2012/0194393 A1* | 8/2012 | Uttermann ............ H01Q 1/42 343/702 |
| 2012/0236526 A1* | 9/2012 | Weber ............ C03C 21/002 361/807 |
| 2012/0250273 A1 | 10/2012 | Kuo |
| 2013/0128434 A1* | 5/2013 | Yamamoto ........... C03C 3/085 361/679.01 |
| 2014/0233161 A1* | 8/2014 | Liu ................. C03C 15/00 361/679.01 |
| 2014/0311882 A1 | 10/2014 | Terashita |
| 2015/0002993 A1 | 1/2015 | Lee |
| 2015/0030834 A1 | 1/2015 | Morey et al. |
| 2015/0104618 A1 | 4/2015 | Hayashi et al. |
| 2015/0122406 A1 | 5/2015 | Fisher et al. |
| 2015/0202854 A1 | 7/2015 | Tsuchiya et al. |
| 2015/0232366 A1 | 8/2015 | Fredholm et al. |
| 2015/0245514 A1 | 8/2015 | Choung |
| 2016/0083282 A1 | 3/2016 | Jouanno et al. |
| 2016/0137550 A1 | 5/2016 | Murata et al. |
| 2017/0066223 A1 | 3/2017 | Notsu et al. |
| 2017/0282503 A1 | 10/2017 | Peng et al. |
| 2017/0305788 A1 | 10/2017 | Nikulin |
| 2017/0311466 A1 | 10/2017 | Memering et al. |
| 2017/0355633 A1 | 12/2017 | Cook et al. |
| 2018/0086663 A1 | 3/2018 | Luzzato et al. |
| 2018/0088399 A1 | 3/2018 | Fukushi et al. |
| 2018/0125756 A1 | 5/2018 | Gerrish et al. |
| 2018/0126704 A1 | 5/2018 | Zhang et al. |
| 2018/0154615 A1 | 6/2018 | Dohn et al. |
| 2018/0237325 A1 | 8/2018 | Li et al. |
| 2018/0304825 A1 | 10/2018 | Mattelet et al. |
| 2018/0370843 A1 | 12/2018 | Gross et al. |
| 2019/0022979 A1 | 1/2019 | Luzzato et al. |
| 2019/0134944 A1 | 5/2019 | Dawson-Elli |
| 2019/0160787 A1 | 5/2019 | Bartlow et al. |
| 2019/0161402 A1 | 5/2019 | Harris et al. |
| 2019/0169061 A1 | 6/2019 | Jones et al. |
| 2019/0263708 A1 | 8/2019 | Bookbinder et al. |
| 2019/0293838 A1 | 9/2019 | Haba et al. |
| 2020/0095159 A1 | 3/2020 | Marshall et al. |

FOREIGN PATENT DOCUMENTS

| | | |
|---|---|---|
| WO | WO2012/027660 | 3/2012 |
| WO | WO2012/074983 | 6/2012 |
| WO | WO2015/0031420 | 3/2015 |
| WO | WO2016/065118 | 4/2016 |
| WO | WO2017/196800 | 11/2017 |
| WO | WO2019/199791 | 10/2019 |

OTHER PUBLICATIONS

Aben et al., "A New Method for Tempering Stress Measurement in Glass Panels," Estonian Journal of Engineering, vol. 19, No. 4, pp. 292-297, 2013.

Bourhis, "Production Control of Residual Stresses," Glass Mechanics and Technology, Second Edition, pp. 236-243, 2014.

Mao et al., "Fabrication and characterization of 20 nm planar nanofluidic channels by glass-glass and glass-silicon bonding," www.rsc.org/loc, 8 pages, Jun. 30, 2005.

Decourcelle, et al., "Controlling Anisotropy," Conference Proceedings, All Eyes on Glass, Glass Performance Days, Tampere, Finland, Jun. 28-30, 2017.

* cited by examiner

SELECTIVELY HEAT-TREATED GLASS-CERAMIC FOR AN ELECTRONIC DEVICE

CROSS-REFERENCE TO RELATED APPLICATION(S)

This application is a non-provisional patent application of and claims the benefit of U.S. Provisional Patent Application No. 62/593,564, filed Dec. 1, 2017 and titled "Selectively Heat-Treated Glass-Ceramic for an Electronic Device," the disclosure of which is hereby incorporated herein by reference in its entirety.

FIELD

Embodiments described herein relate to electronic device components and, in particular, selectively heat-treated glass-ceramic parts for use in electronic devices.

BACKGROUND

Many traditional electronic devices include parts formed of glass-ceramic materials, such as cover sheets and the like. Many traditional glass-ceramic parts include consistent material properties throughout. This leads to many portions of a glass-ceramic part having material properties that are not well-suited for the glass part's function and/or position on the device. In many cases, it is advantageous to have different material properties at different locations on a device.

SUMMARY

Certain embodiments described herein generally reference a method for forming a glass-ceramic part having first and second regions with differently-sized ceramic crystals. The method includes heating the first region of a glass part to a first temperature that is at or above a crystallization temperature of the glass part. The method further includes maintaining the second region of the glass part at or below a second temperature that is below the first temperature, thereby converting the glass part to a glass-ceramic part with the first region having a first median crystal size and the second region having a second median crystal size that is less than the first median crystal size.

Other embodiments described generally reference a method for forming a glass-ceramic part having first and second regions with different crystal densities. The method includes heating a first region of a glass part to a first temperature that is at or above a nucleation temperature of the glass part. The method further includes maintaining a second region of the glass part at or below a second temperature that is below the first temperature. The method further includes subsequently heating the first region of the glass part to a third temperature at or above a crystallization temperature of the glass part, thereby converting the glass part to a glass-ceramic part with the first region having a first crystal density and the second region having a second crystal density that is less than the first crystal density.

Still further embodiments described herein relate to, include, or take the form of an electronic device that includes a display, a housing, and a cover sheet affixed to the housing and positioned adjacent to the display. The cover sheet includes an optically hazed first region having a first median crystal size and an optically transparent second region having a second median crystal size that is smaller than a size that causes scattering of light.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
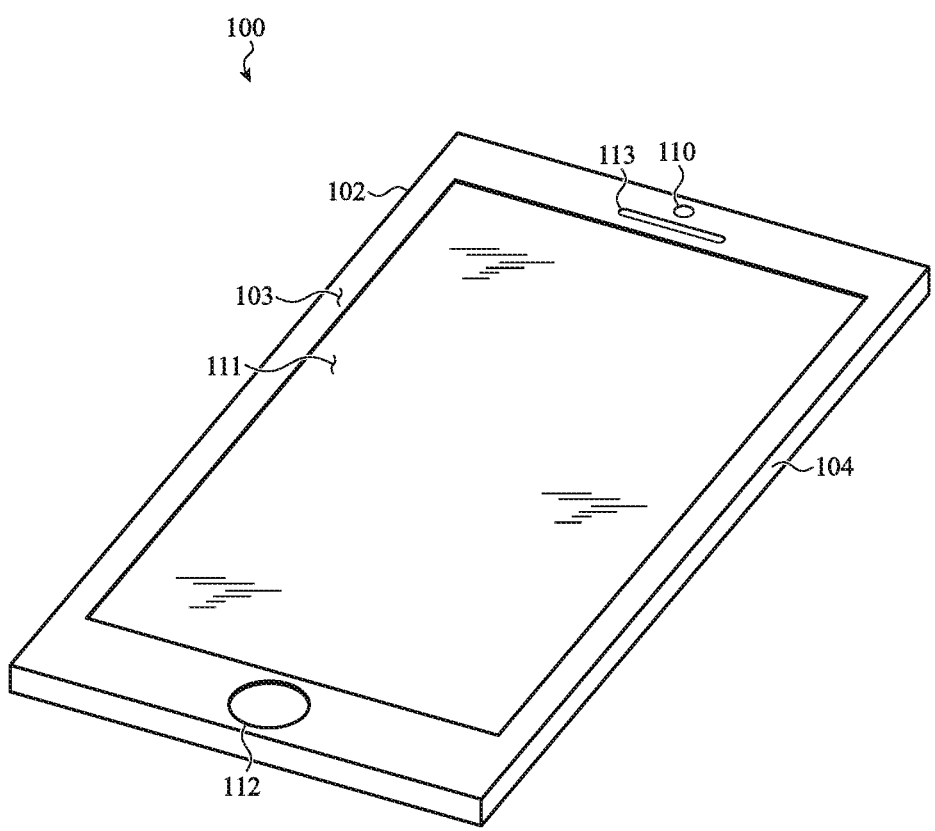
FIG. 1 illustrates an example electronic device that may incorporate selectively heat-treated glass-ceramics, according to one or more embodiments presented herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

The embodiments disclosed herein are directed to selectively heat treating glass to form glass-ceramic parts for use in an electronic device. In various embodiments, glass-ceramic parts, such as a cover sheet (e.g., a cover glass), may have multiple different regions having different objectives for material properties such as optical properties, strength, fracture toughness, hardness, and the like.

For example, in a region of a glass-ceramic part (e.g., a cover sheet, input surface, housing, or the like) that is adjacent to a display of the electronic device, it may be desirable for the glass-ceramic part to be transparent (e.g., allowing light to pass through the material without being scattered) such that information presented on the display is unaffected by visual defects, distortion, or other artifacts induced by the glass part. Similarly, in a region of the glass-ceramic part that is adjacent to a camera of the electronic device, it may be desirable for the glass-ceramic part to be transparent to avoid distortion of images captured by the camera. Likewise, in a region of the glass-ceramic part that is adjacent to a sensor of the electronic device, it may be desirable for the glass-ceramic part to be transparent to avoid adversely impacting sensor performance.

In other regions of the glass-ceramic part, such as regions near or along the edges of the electronic device that may be subjected to impact forces, it may be less important that the glass-ceramic part be transparent, and instead be more desirable for the glass-ceramic part to have different material properties such as increased strength, fracture toughness, and/or hardness. Accordingly, the glass-ceramic part may be manufactured or otherwise processed to achieve different material properties within different regions of the part.

To form a glass-ceramic part having varying material properties, a glass part having a randomly arranged atomic structure may be selectively heat treated to create an ordered crystalline structure in one or more regions of the part. Based on the selective heat treatment, the presence of a crystalline structure and the characteristics (e.g., crystal size and density) of the crystalline structure may vary across the part, which results in varying material properties across the part. In one embodiment, one or more regions of the glass-ceramic part still includes one or more regions of glass (e.g., having a randomly arranged atomic structure) after the selective heat treatment along with one or more regions of glass-ceramic (e.g., having an ordered crystalline structure). In another embodiment, the glass-ceramic part does not include regions of glass after the selective heat treatment.

Heat treatment and the resulting change in the atomic structure (e.g., crystal growth) may result in one or more regions of a glass-ceramic part having different material properties than the glass from which it was formed. The material properties that may change include optical properties (e.g., transparency), Young's modulus (e.g., stiffness), strength (e.g., ability to withstand stress without fracture), fracture toughness (e.g., ability of a cracked glass part to withstand stress without fracture), and/or hardness (e.g., ability to resist abrasion). Heat treatment may affect the transparency a glass-ceramic part, for example by inducing an optical haze. In one embodiment, haze in the glass-ceramic part is caused by crystal growth in the glass-ceramic in which the crystals are of a sufficient size and/or density to scatter light.

Detailed embodiments of these general considerations will now be disclosed in relation to the accompanying figures.

FIG. 1 illustrates an example electronic device 100 that may incorporate selectively heat-treated glass-ceramics, according to one or more embodiments presented herein. The electronic device 100 includes a device housing 104 and cover sheet 102 affixed to the device housing. The cover sheet 102 may be formed of a selectively heat-treated glass-ceramic material. The electronic device 100 may additionally include a camera 110, a display 111, one or more buttons 112, and/or an output device (such as a speaker) 113.

The cover sheet 102 may be disposed at any of several locations on (or in) the device housing 104. For example, the cover sheet 102 may be positioned at least partially over the display 111 of the electronic device 100 as depicted in FIG. 1. The cover sheet 102 may define one or more exterior surfaces of the electronic device 100. In the embodiment of FIG. 1, the cover sheet 102 defines a top surface 103 of the electronic device 100. The cover sheet 102 may include one or more openings, such as an opening to allow inputs at the button 112, an opening adjacent the speaker 113, and so on. Alternatively or additionally, the cover sheet 102 may be positioned on a different surface or portion of an electronic device 100, such as a sidewall, a top surface, a bottom surface, and the like.

The electronic device 100 can also include one or more internal components (not shown) typical of a computing or electronic device, such as, for example, one or more processors, memory components, network interfaces, and so on. Furthermore, although the electronic device 100 is illustrated as a cellular phone, It should be appreciated that any number of electronic devices may incorporate a selectively heat-treated glass-ceramic part, including (but not limited to): a computer, a laptop computer, a tablet computer, a phone, a wearable device, a health monitoring device, a home or building automation device, a home or building appliance, a craft or vehicle entertainment, control, and/or information system, a navigation device, a personal digital assistant, a media player, a watch, another wearable device, a touch-sensitive device, a keypad, a keyboard, and so on.

The device housing 104 provides a device structure, defines an internal volume of the electronic device 100, and houses device components. In various embodiments, the device housing 104 may be constructed from any suitable material, including metals (e.g., aluminum, titanium, and the like), polymers, ceramics (e.g., glass, sapphire), and the like. In one embodiment, the device housing 104 is constructed from multiple materials. The device housing 104 can form an outer surface or partial outer surface and protective case for the internal components of the electronic device 100.

The display 111 can be implemented with any suitable technology, including, but not limited to liquid crystal display (LCD) technology, light emitting diode (LED) technology, organic light-emitting display (OLED) technology, organic electroluminescence (OEL) technology, or another type of display technology. The display 111 provides a graphical output, for example associated with an operating system, user interface, and/or applications of the electronic device 100. In one embodiment, the display 111 includes one or more sensors and is configured as a touch-sensitive (e.g., single-touch, multi-touch) and/or force-sensitive display to receive inputs from a user. In various embodiments, a graphical output of the display 111 is responsive to inputs provided at the display and/or the buttons 112.

As discussed above, in various embodiments, it may be desirable to have different material properties of the cover sheet 102 in different regions of the cover sheet. For example, different properties may be appropriate in different regions of the cover sheet 102 based on the position of the regions with respect to other device components. Accordingly, the cover sheet 102 may be manufactured or otherwise processed to achieve different material properties within different regions of the cover sheet.

One method for achieving different material properties within different regions of the cover sheet is to selectively heat treat the cover sheet 102. As discussed above, heat treatment may change the material properties of the cover sheet, such as Young's modulus, strength, fracture toughness, and/or hardness. However, heat treatment may also effect the transparency part of the cover sheet, for example by inducing an optical haze. In one embodiment, haze in the glass is caused by crystal growth in the cover sheet in which the crystals are of a sufficient size and/or density within the cover sheet to scatter light.

Figure 2A:
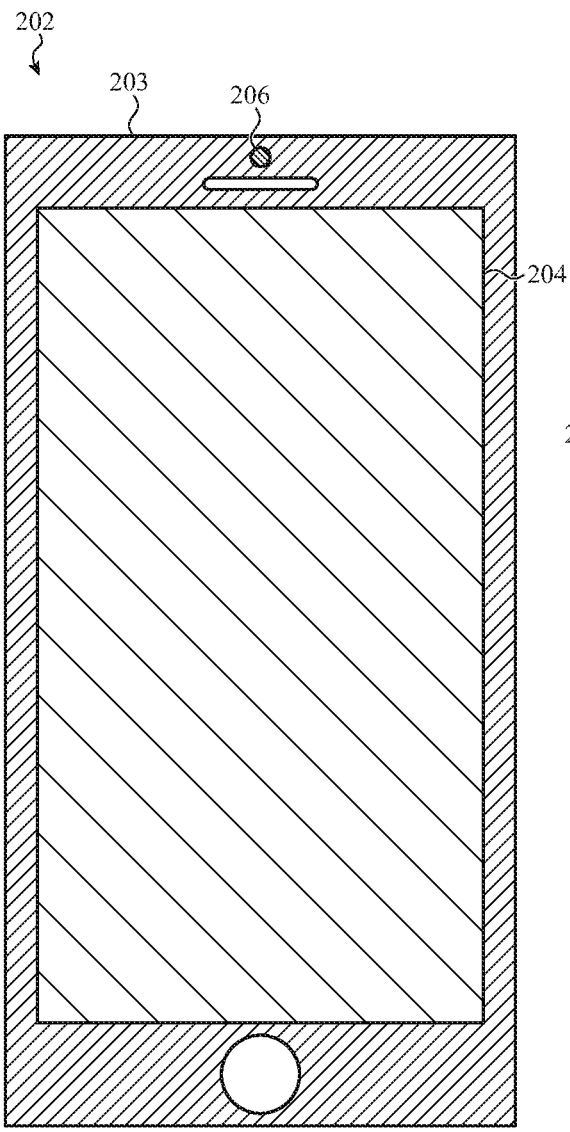
FIGS. 2A and 2B illustrate example selective heat treatment patterns for a glass-ceramic cover sheet of an electronic device.
Figure 2B:
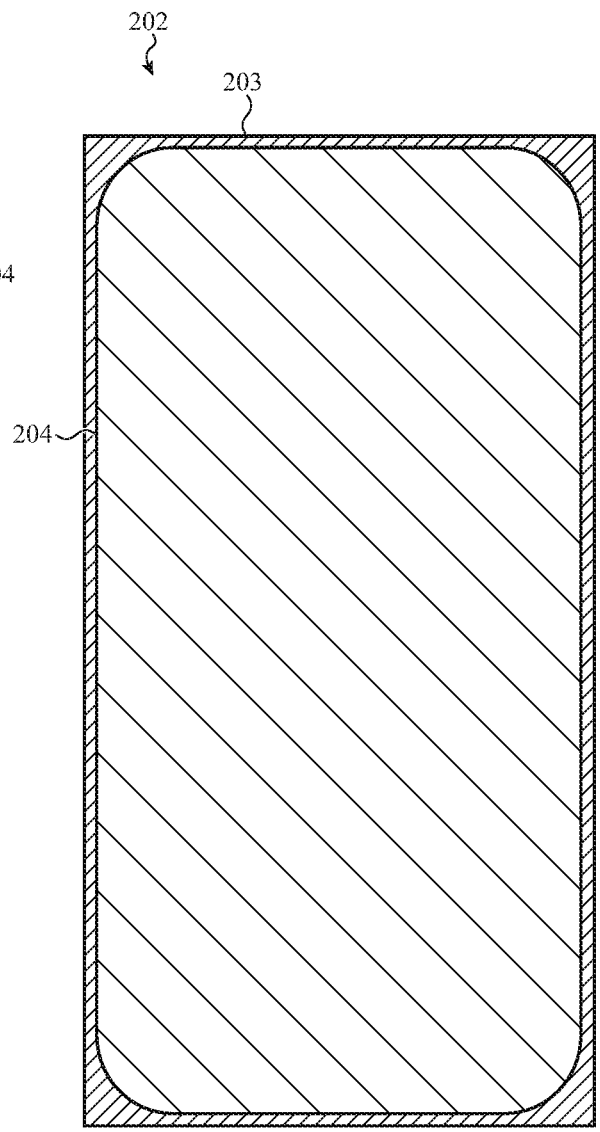

FIGS. 2A and 2B illustrate example selective heat treatment patterns for a glass-ceramic cover sheet of an electronic device. In various embodiments, the selective heat treatment patterns result in different material properties in different regions of the cover sheet.

FIG. 2A illustrates an example selective heat treatment pattern for the cover sheet 102 in which the region 204 of the cover sheet that is not adjacent to the camera or the display is selectively heat treated, for example to increase the strength, fracture toughness, and/or hardness of the region. Similarly, FIG. 2B illustrates an example selective heat treatment pattern for the cover sheet 102 in which the selectively heat-treated region 204 corresponds to areas of the cover sheet near the edges and corners of the device. These areas may be more likely to suffer damage than areas farther from the edges of the device and so may be treated to increase their strength and/or toughness (e.g., resistance to impact).

Regions 204 and 206 are adjacent to the display and the camera, and so may have sufficient transparency to avoid distortion of information and images. Further, regions 204 and 206 and/or farther from the edges of the electronic device, so they may be less susceptible to damage. In one embodiment, these regions are not heat treated to maximize the optical performance of the glass. In other embodiments, regions 204 and 206 may be heat treated, but not to a degree that induces an optical haze that affects the transparency of the glass.

In various embodiments, the electronic device 100 may have multiple different regions having different objectives for material properties such as optical properties, strength, fracture toughness, hardness, and the like. Different regions may be selectively heat treated to achieve desired results.

Figure 3:
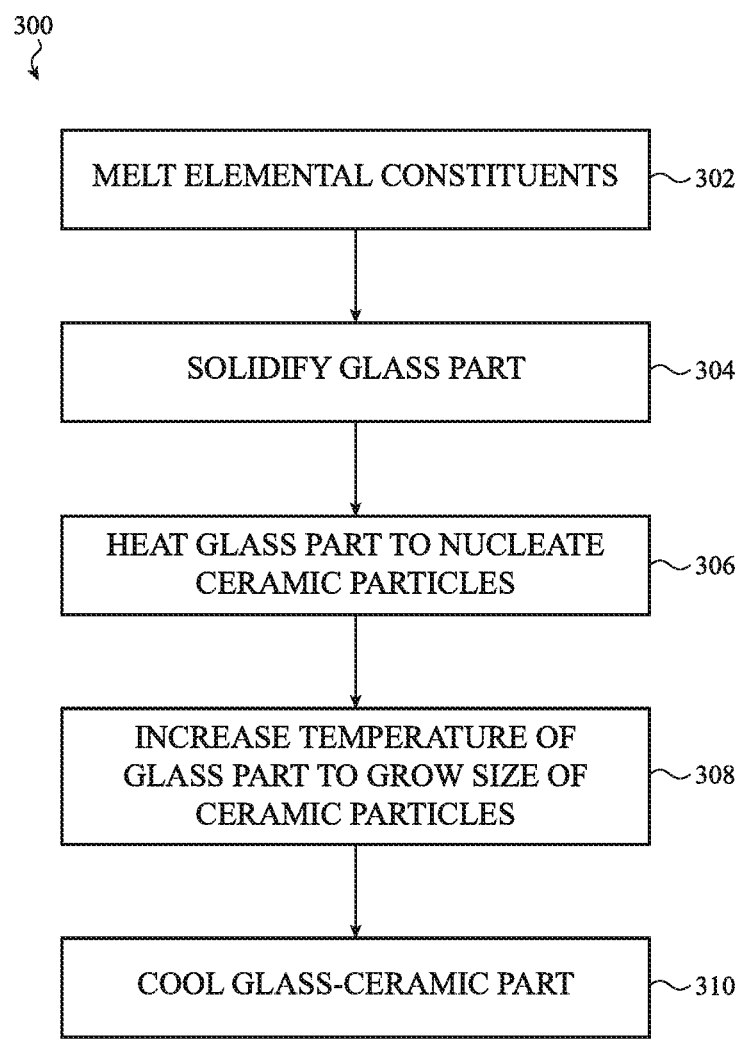
FIG. 3 is a simplified flow chart depicting an example process for manufacturing a selectively heat-treated glass-ceramic part as described herein.
Figure 4:
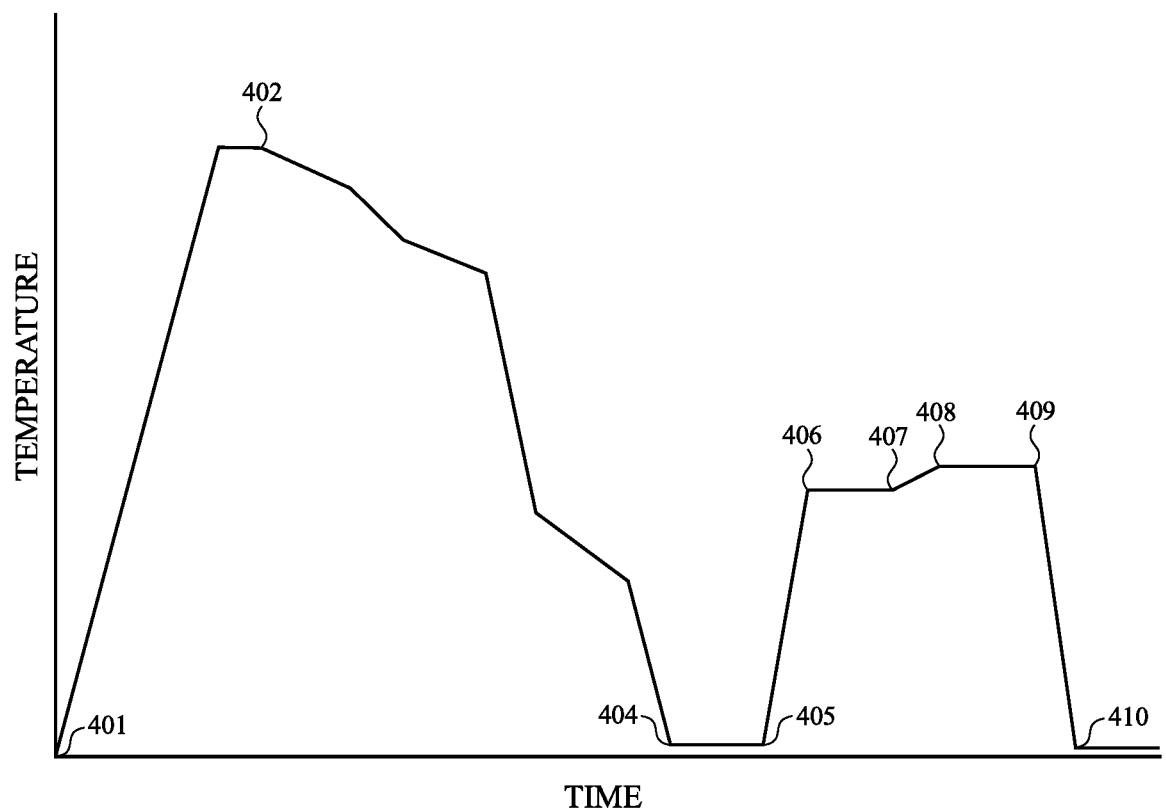
FIG. 4 is a chart illustrating an example heat treatment temperature profile over time for the example process described with respect to FIG. 3.

FIG. 3 is a simplified flow chart depicting an example process for manufacturing a selectively heat-treated glass-ceramic part (e.g., the cover sheet of FIGS. 1 and 2) as described herein. In the process 300 shown in FIG. 3, elemental constituents are formed into a glass and subsequently heat treated to form a glass-ceramic. FIG. 4 is a chart illustrating an example heat treatment temperature profile over time for the example process described with respect to FIG. 3.

Referring now to FIG. 3, the process 300 includes operation 302 in which elemental constituents are heated to a temperature at or above their melting point using a heat source (e.g., a furnace, kiln, laser, or the like). The elemental constituents may be a glass-ceramic system, such as an LAS system ($Li_2O \times Al_2O_3 \times nSiO_2$), an MAS system ($MgO \times Al_2O_3 \times nSiO_2$), a ZAS system ($ZnO \times Al_2O_3 \times nSiO_2$), or a different combination of materials. The elemental constituents may include nucleating agents such as silver, gold, platinum, palladium, zirconium oxide and/or titanium oxide. In one embodiment, the melting point may be at or above 1600 degrees Celsius. Turning to the example of FIG. 4, the heating to the temperature at or above the melting point is shown by the temperature increase between position 401 and position 402.

Returning to FIG. 3, at operation 304, the melted elemental constituents are solidified (e.g., cooled) to form a glass part. In one embodiment, the glass part has a randomly arranged atomic structure. The glass part may be formed without any ceramic particles therein, but instead with components or elements that may precipitate to form nucleates that may be grown into ceramic particles. In other embodiments, the glass part is formed with ceramic particles, for example based on thermal conditions during the cooling process. In the example of FIG. 4, the glass cooling process is shown as the temperature decreases between positions 402 and 404. In one embodiment, solidification begins between 1200 degrees Celsius and 1300 degrees Celsius. Cooling may continue at this stage to room temperature. Following operation 304, the glass part may be inspected and/or formed into an appropriate shape. This may involve cutting, polishing, and other processes to achieve the appropriate shape for the eventual use of the glass part.

Returning to FIG. 3, after the glass part is formed, the glass part may be heat treated to form a glass-ceramic. At operation 306, at least a portion of the glass part is heated to a temperature at or above a nucleation temperature of the material to create nucleation sites. In the example of FIG. 4, the nucleation operation 306 is shown as the temperature increases between positions 405 and 406, and temperature being maintained between positions 406 and 407. As used herein, "nucleation temperature" generally refers to a temperature at which substantial nucleation occurs in the glass part. Nucleation is the process by which nucleation sites self-organize in the glass part. Nucleation sites are sites where crystal growth may occur under the right temperature conditions. In one embodiment, the elemental constituents include one or more nucleating agents to enhance the nucleation process, such as silver, gold, platinum, palladium, zirconium oxide and/or titanium oxide. In one embodiment, the nucleation temperature is between 700 and 800 degrees Celsius. In another embodiment, the nucleation temperature is between 600 and 900 degrees Celsius. In still another embodiment, the nucleation temperature is between 500 and 1000 degrees Celsius.

Figure 5A:
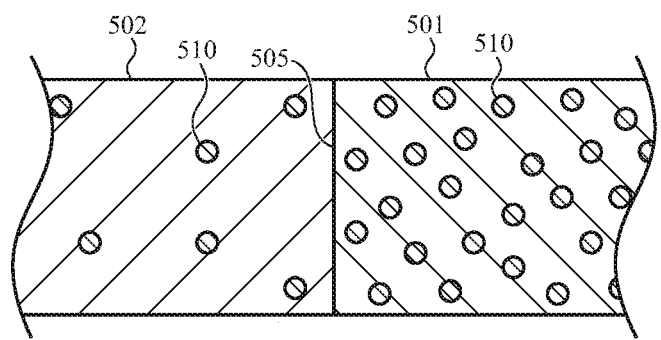
FIG. 5A-5B illustrate cross-sections of example glass-ceramic parts having a first region and a second region, with a border separating the regions.

As discussed above, different regions of the glass part may be heated to different temperatures and/or at different rates during operation 306 to achieve different nucleation rates and/or densities in different regions of the part. This results in different atomic structures within the different regions of the glass-ceramic part that is formed. FIG. 5A illustrates a cross-section of an example glass part 500 having a first region 501 and a second region 502, with a border 505 separating the regions. In one embodiment, during a nucleation operation such as operation 306, the first region 501 of the glass part 500 may be heated to a temperature at or above a nucleation temperature of the glass part 500 and maintained for a period of time, while the second region 502 may be maintained at a different temperature below the nucleation temperature of the glass part 500. As shown in FIG. 5A, this may result in a higher density of nucleation sites 510 in the first region 501 than in the second region 502. In one embodiment, no nucleation sites 510 are formed in the second region 502. In another embodiment shown in FIG. 5A, nucleation sites 510 are formed in the second region 502, but at a lesser density than the nucleation sites 510 in the first region 501. In still another embodiment, the entire glass part is heated uniformly during operation 306, so nucleation is substantially consistent across the entire glass part. Selective nucleation is discussed in more detail below with respect to FIG. 12.

Returning to FIG. 3, during operation 308, at least a portion of the glass part is heated to a temperature at or above a crystallization temperature of the glass part to induce crystal growth that results in the conversion of the glass to a glass-ceramic. In the example of FIG. 4, the crystallization operation 308 is shown as the temperature increases between position 407 and 408 and the temperature being maintained between positions 408 and 409. As used herein, "crystallization temperature" generally refers to a temperature at which substantial crystal growth occurs. Crystal growth is the arrangement of atoms, molecules, or ions into an orderly repeating pattern extending in all three spatial dimensions, which results in a glass-ceramic. In one embodiment, the crystallization temperature is between 750 and 850 degrees Celsius. In another embodiment, the crystallization temperature is between 650 and 950 degrees Celsius. In still another embodiment, the crystallization temperature is between 550 and 1050 degrees Celsius.

Figure 5B:
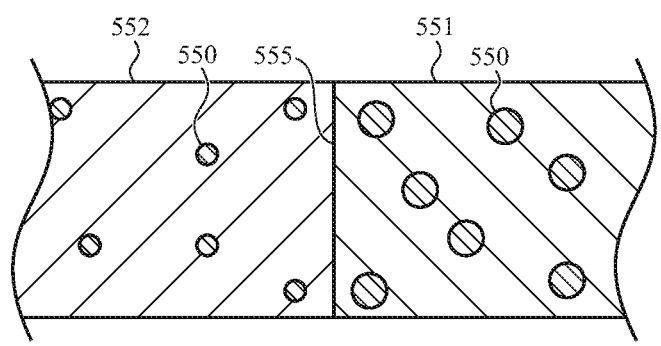

As discussed above, different regions of the glass part may be heated to different temperatures and/or at different rates during operation 308 to achieve differing crystal growth rates and/or densities in different regions of the glass-ceramic part that is formed as a result of the heat treatment. FIG. 5B illustrates a cross-section of an example glass-ceramic part 550 that has undergone a conversion from a glass to a glass-ceramic. The glass-ceramic part 550 has a first region 551 and a second region 552, and a border 555 separating the regions. In one embodiment, during a crystallization operation such as operation 308, the first region 551 may be heated to a temperature at or above a crystallization temperature of the material and maintained for a period of time, while a second region 552 may be maintained at a different temperature below the crystallization temperature of the material. This may result in a higher rate of crystal growth of crystals 560 in the first region 551 than in the second region 552. As shown in FIG. 5B, the first region thus has a larger average crystal size than the second region. In one embodiment, no crystal growth occurs in the second region. In another embodiment, crystal growth occurs in the second region, but at a lower rate than the crystal growth in the first region. In still another embodiment, both regions 551 and 552 are heated uniformly during operation 306, so crystal growth is substantially consistent across the entire part. Selective crystal growth is discussed in more detail below with respect to FIG. 12.

In the embodiments of FIGS. 5A and 5B, the nucleation sites and crystals are shown with circular cross-sections for illustrative purposes. In practice, the nucleation sites and crystals may take a variety of shapes and have varying cross-sections according to their structure.

Returning to FIG. 3, at operation 310, the glass-ceramic part is cooled after the crystallization operation 308. In the example of FIG. 4, the cooling operation is shown as the temperature decrease from position 409 to position 410. Optionally, the glass-ceramic part may undergo additional finishing and/or pressing operations.

In the operations of FIG. 3, changes to the timing of the various steps will result in different material properties. For example, the longer a region of a glass-ceramic part that is maintained at or above its crystallization temperature, the more crystal growth will occur. Similarly, rates of change of the temperatures and the temperature values themselves will affect the properties as well. Thus, adjusting the time at temperature, rate of change, and/or temperature values for each of the steps will result in different outcomes and material properties.

After the heat treatment of the glass-ceramic part (e.g., the nucleation and crystallization operations), at least a portion of the glass-ceramic part may have a polycrystalline structure, in which a number of single crystals or crystallites are held together by layers of amorphous solid. The polycrystalline structure of the glass-ceramic part may result in the glass-ceramic part having different material properties than an untreated glass part, such as hardness, modulus, density, optical properties, chemical resistivity, and viscosity at elevated temperatures.

FIGS. 6-11B illustrate glass parts undergoing selective heat treatment to form a glass-ceramic part using a variety of methods. In various embodiments, the heat treatment may include nucleation and/or crystallization operations as described above. In general, the methods described with respect to FIGS. 6-11B are directed to heating and/or cooling one or more regions of a glass part differently than one or more other regions of the glass part. The methods described with respect to FIGS. 6-10 are applicable to applying or removing heat during nucleation operations, crystallization operations, and other heat treatment operations.

Figure 6:
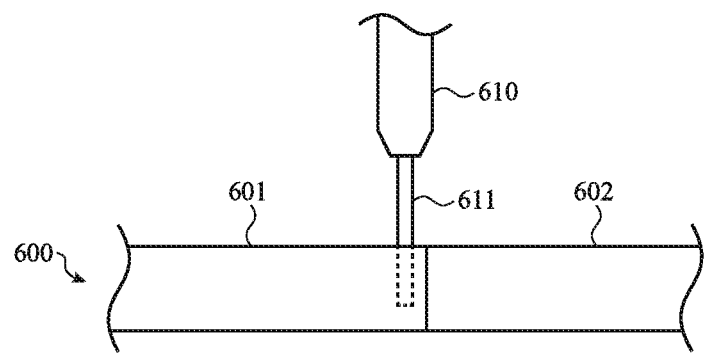
FIG. 6 shows a glass part undergoing selective heat treatment to form a glass-ceramic part using a laser.

FIG. 6 shows a glass part 600 undergoing selective heat treatment to form a glass-ceramic part using a laser 610. In various embodiments, a laser is used to heat a first region 601 of the glass part 600, while not applying heat (or applying less heat) to a second region 602. In one embodiment, the laser beam 611 is a focused beam capable of delivering energy to a beam spot. In another embodiment, the laser beam 611 is a broad beam configured to deliver energy to a wide area. In this embodiment, a mask may be applied to the second region 602 to shield the second region from at least a portion of the energy transmitted by the laser beam 611.

In various embodiments, the laser 610 may be configured to deposit energy at a particular depth (e.g., a certain distance from the top surface or bottom surface of the glass part 600 with respect to FIG. 6). Depositing energy at a particular depth allows the laser to heat the first region 601 of the glass part 600 more uniformly throughout its thickness than heat applied to an exterior surface. Accordingly, a border between the regions 601, 602 may be more finely controlled and substantially perpendicular to the top and bottom surfaces as shown in FIG. 6.

In one embodiment, the laser 610 is used in conjunction with one or more heat sources (e.g., a furnace, a conductive coating, and the like) and/or temperature regulation mechanisms (e.g., a heat sink, a low-emissivity coating, a gas or liquid cooling device, and the like). In one embodiment, the laser 610 is used in conjunction with a furnace. The entire glass part 600 may be placed in a furnace to achieve a temperature that is near, but below, a significant temperature (e.g., the nucleation temperature, the crystallization temperature, and so on). Then, the laser 610 may be used to heat the first region 601 to a higher temperature (e.g., a temperature at or above the nucleation temperature or the crystallization temperature), while the second region 602 is maintained at the lower temperature.

In various embodiments, the laser 610 may be any suitable type of laser for applying energy to the glass part 600.

Examples include gas lasers, chemical lasers, solid state lasers, fiber lasers, photonic crystal lasers, semiconductor lasers, and so on.

Figure 7:
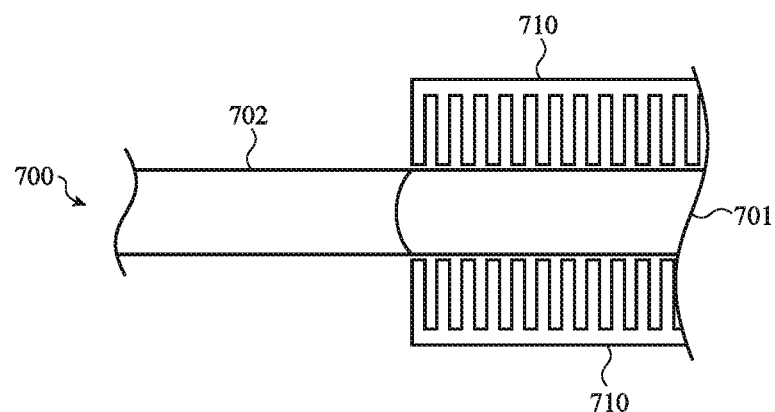
FIG. 7 shows a glass part undergoing selective heat treatment to form a glass-ceramic part using heat sinks.

FIG. 7 shows a glass part 700 undergoing selective heat treatment to form a glass-ceramic part using heat sinks 710. In various embodiments, one or more heat sinks 710 are disposed adjacent to a first region 701 of the glass part 700. The heat sinks 710 may be used to remove heat from the first region 701 of the glass part 700 while the glass part 700 is heated, for example in a furnace. The heat sinks 710 allow the first region 701 to be maintained at a lower temperature than a second region 702 that is not adjacent to the heat sinks 710. In one embodiment, the heat sinks 710 are straight fin heat sinks as shown in FIG. 7. In other embodiments, the heat sinks may take many forms, such as pin fin heat sinks, flared fin heat sinks, or another type of heat sink. The heat sinks 710 may contact the glass part 700 or there may be a gap between the heat sinks 710 and the glass part 700.

In various embodiments, the heat sink 710 transfers heat from the glass part 700 to a fluid medium. In one embodiment, the fluid medium is air. In another embodiment, the fluid medium is another gas or liquid such as a coolant. The heat sink 710 may be formed of any suitable material for conducting heat, such as copper, aluminum, or the like. The heat sink 710 may be used alone or in combination with other heating and/or temperature regulation operations such as those described herein.

Figure 8:
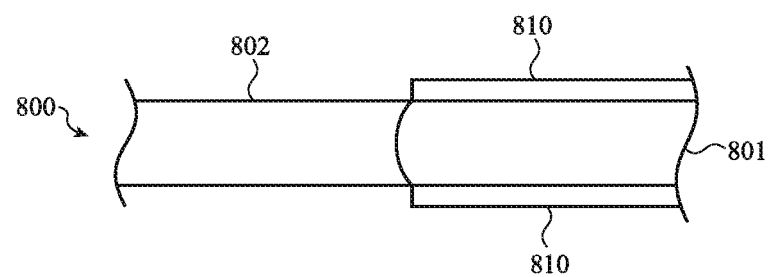
FIG. 8 shows a glass part undergoing selective heat treatment to form a glass-ceramic part using a conductive coating to inductively heat a portion of the glass part.

FIG. 8 shows a glass part 800 undergoing selective heat treatment to form a glass-ceramic part using a conductive coating 810 to inductively heat a portion of the glass part. In various embodiments, the conductive coating 810 is disposed adjacent to a first region 801 of the glass part 800. The conductive coating 810 may be applied to one or more surfaces of the glass part 800. An electrical current may then be applied to the conductive coating 810, which results in inductive heating of the first region 801 of the glass part 800, while the second region 802 is not heated (or heated less). The conductive coating 810 may be formed of any suitable conductive material, such as copper. The conductive coating 810 may be used alone or in combination with other heating and/or temperature regulation operations such as those described herein.

Figure 9:
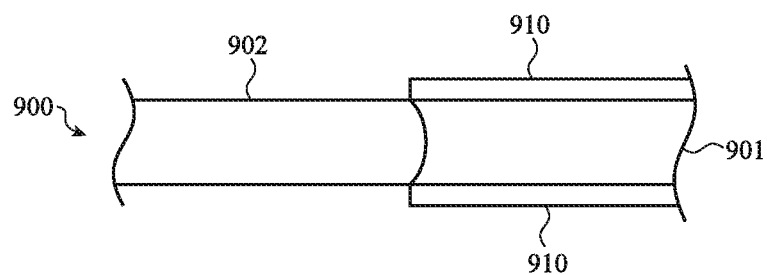
FIG. 9 shows a glass part undergoing selective heat treatment to form a glass-ceramic part using a low-emissivity coating to shield a portion of the glass part.

FIG. 9 shows a glass part 900 undergoing selective heat treatment to form a glass-ceramic part using a low-emissivity coating 910 to shield a portion of the glass part. In various embodiments, the low-emissivity coating 910 is disposed adjacent to a first region 901 of the glass part 900. The low-emissivity coating 910 may be applied to one or more surface of the glass part 800. In various embodiments, heat is applied to the glass part 900, for example using one or more of a furnace, laser, conductive coating(s), or the like. The low-emissivity coating 910 shields the first region 901 and allows less heat energy into the first region 901, and thus results in a lower temperature of the first region than the second region 902. The low-emissivity coating 910 may be any suitable material for blocking heat energy, such as silver. In one embodiment, the low-emissivity coating 910 is a layer of silver with a thickness between 1 and 5 nanometers. The low-emissivity coating 910 may be used alone or in combination with other heating and/or temperature regulation operations such as those described herein.

Figure 10:
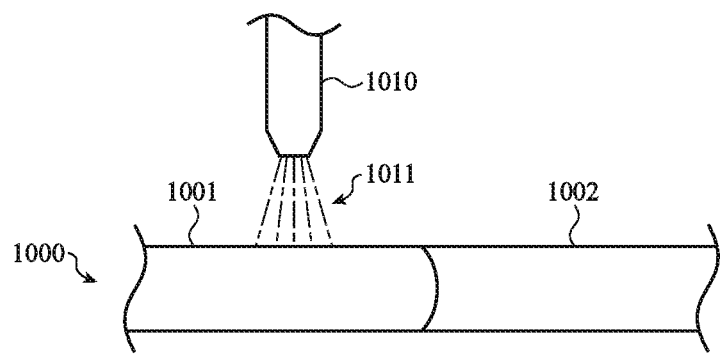
FIG. 10 shows a glass part undergoing selective heat treatment to form a glass-ceramic part using a gas and/or fluid cooling device.

FIG. 10 shows a glass part 1000 undergoing selective heat treatment to form a glass-ceramic part using a gas and/or fluid cooling device 1010. In various embodiments, heat is applied to the glass part 1000, for example using one or more of a furnace, laser, conductive coating(s), or the like. The cooling device 1010 regulates the temperature of a first region 1001 of the glass part 1000 while the glass part 1000 is heated such that a second region 1002 experiences higher temperatures and/or higher rates of temperature increases compared to the first region 1001. Regulating the temperature may include cooling the first region 1001, maintaining the temperature of the first region 1001, and/or reducing a rate of temperature increase of the first region 1001. The cooling device 1010 may be any suitable device for applying a coolant, such as a gas or liquid. The cooling device 1010 may be used alone or in combination with other heating and/or temperature regulation operations such as those described herein.

Selectively heat-treated glass-ceramic parts with multiple regions include borders between the regions that d have different material properties. Based on how heat is applied and/or removed from the different regions, the borders may include a gradient or transition zone in which the material properties gradually change from those consistent with the first region to those consistent with the second region. In one embodiment, this gradient exists in a direction perpendicular to the interface of the two regions (e.g., left-to-right or right-to-left with respect to FIGS. 6-10. For example, if a first region has a first median crystal size and a second region has a second median crystal size, the border may include a portion of the glass part where the median crystal size transitions from the first median crystal size to the second median crystal size. This is a result of temperature gradients that occur during heating.

Similarly, a glass-ceramic part that is heated from the surface (e.g., a top or bottom surface) during selective heat treatment may have different material properties at different distances from the surface of the glass-ceramic part because of different heating that occurs at different distances from the surface. Along a border between regions, this may result in a border that differs in its lateral position (e.g., left-to-right or right-to-left with respect to FIGS. 7-10) through the thickness (e.g., upward-to-downward with respect to FIGS. 7-10) of the glass-ceramic part. This is shown, for example, in FIGS. 7-10, where the border deviates toward each of the regions that were heated to a higher temperature in a middle part along the thickness of the glass-ceramic part.

Figure 11A:
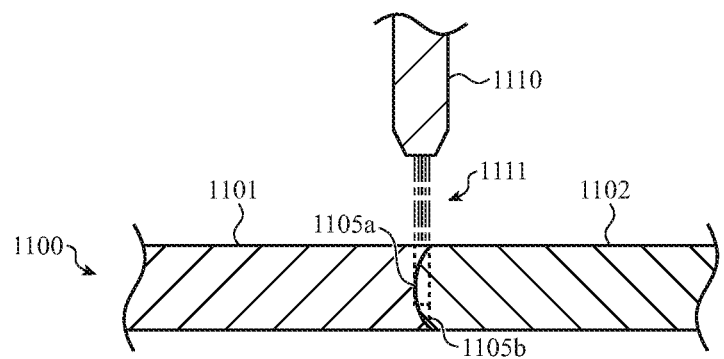
FIGS. 11A and 11B illustrate cross-sections of a selectively heat-treated glass-ceramic part, showing a laser for performing additional heat treatment along a border between regions of the selectively heat-treated glass-ceramic part.
Figure 11B:
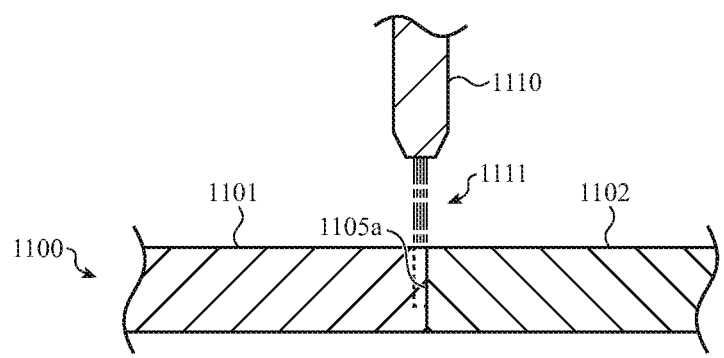

In response to the issues described above, further processing may be used to mitigate the effects of the temperature gradients on the border. FIGS. 11A and 11B illustrate cross-sections of a selectively heat-treated glass-ceramic part showing a laser for performing additional heat treatment along a border between regions of the selectively heat-treated glass-ceramic part. FIG. 11A illustrates an actual border 1105a and a desired border 1105b between differently treated regions 1101 and 1102 of a glass-ceramic part 1100. In the example of FIG. 11A, region 1101 was treated at a higher temperature than region 1102, and the interior of the glass-ceramic part did not reach as high of a temperature for as long as the exterior portions, resulting in an actual border 1105a that deviates from the desired border 1105b. The actual border 1105a is similar to the borders of FIGS. 7-10, and differs in its lateral position through the thickness of the glass-ceramic part 1100, as indicated by its curved shape in cross-section.

In FIG. 11A, a laser 1110 with a focused beam 1111 similar to the laser and beam described with respect to FIG. 6 is used to deposit energy into the part of the region 1102 that is between the actual border 1105a and the desired border 1105b. The energy may be deposited at particular "depths" within the glass-ceramic part 1100 (e.g., different distances from the surfaces). In particular, the laser 1110 may deposit more energy at positions that are in the interior of the glass-ceramic part 1100 (e.g., not close to the top or bottom surface) to target the area between the actual border 1105a and the desired border 1105b for additional heat treatment. The additional heat treatment may result in the area between the actual border 1105a and the desired border 1105b transitioning from having material properties consistent with the region 1102 to having material properties consistent with the region 1101. This effectively moves the actual border 1105a to be substantially the same as the desired border 1105b, as shown in FIG. 11B.

Figure 12:
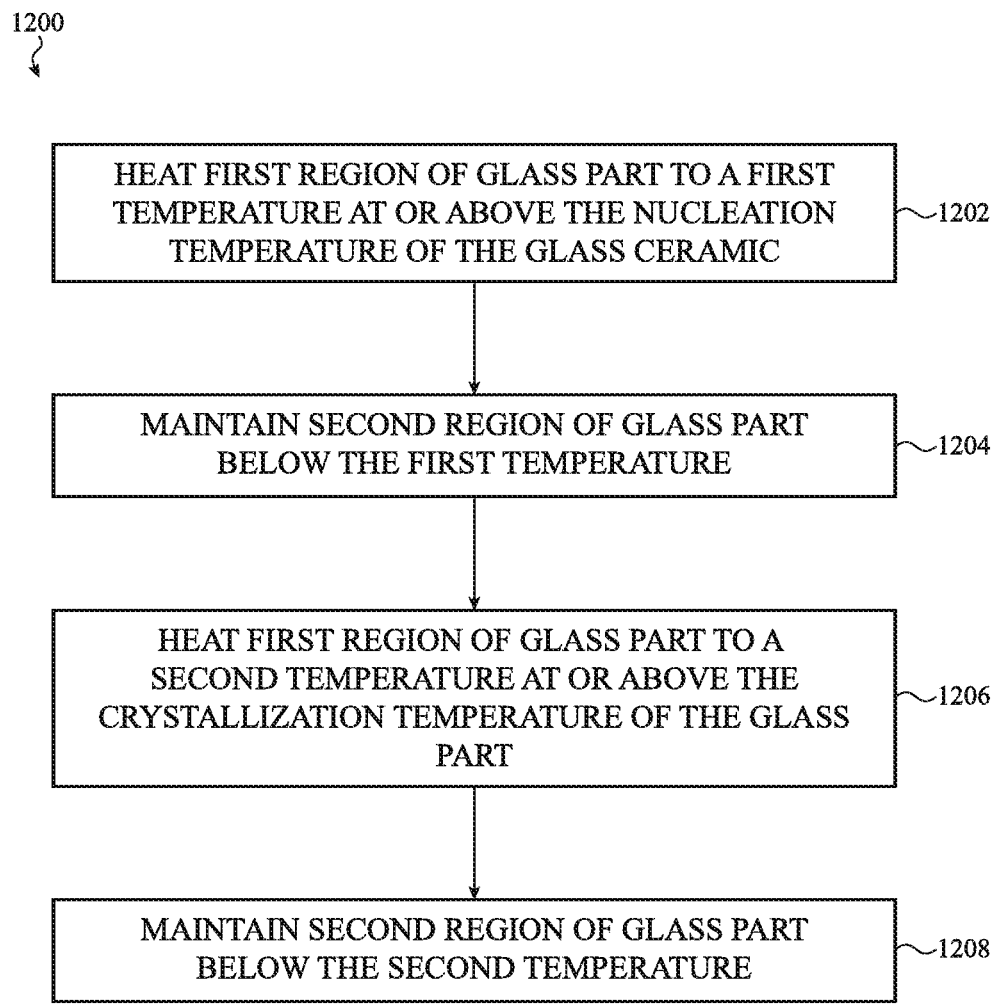
FIG. 12 is a simplified flow chart depicting an example process for forming a selectively heat-treated glass-ceramic part as described herein.

FIG. 12 is a simplified flow chart depicting an example process 1200 for forming a selectively heat-treated glass-ceramic part as described herein. As discussed throughout this application, nucleation and/or crystal growth within different regions of a glass part may be controlled to achieve desired material properties in each region of the resulting glass-ceramic part. For example, as discussed above, a first region may be designed for an area of an electronic device that is more susceptible to damage and/or that is not adjacent to a display, camera, or other sensor. In such a situation, it may be desirable to increase properties such as hardness, strength, and/or fracture toughness within the first region, while transparency may be less important. Conversely, a second region may be designed for an area of an electronic device that is adjacent to a display, camera and/or another sensor. Thus, transparency may be a very important property for the second region.

Crystal growth in the glass part results in conversion to a glass-ceramic having different material properties than the glass part, such as increased hardness, strength, fracture toughness, and the like. Depending on their size and/or density, crystals may also contribute to scattering of light, thereby creating a haze within the glass-ceramic part. This haze may distort graphics transmitted through the glass-ceramic part (e.g., by a display), images collected through the glass-ceramic part (e.g., by a camera), or other data collected by sensors adjacent to the glass-ceramic part, such as fingerprint sensors and the like. As a result, in a situation similar to the one discussed above, it may be appropriate to induce crystal growth in the first region, while limiting or prohibiting crystal growth in the second region. This may be achieved by creating conditions in which different nucleation, crystal growth, or both occur in the different regions. This may include heating and/or maintaining the different regions at different temperatures. It may also include adjusting rates of temperature changes and the times the regions of the part are maintained at certain temperatures.

At operation 1202, a first region of a glass part is heated to a first temperature at or above the nucleation temperature of the glass part. Heat is applied to the glass part, for example using one or more of a furnace, laser, conductive coating(s), or the like. The first region may be maintained at the first temperature for a period of time while nucleation occurs in the first region. During nucleation, nucleation sites are formed within the first region. The nucleation sites have an associated density (e.g., nucleation sites per volume).

At operation 1204, while the first region is at the first temperature, a second region of the glass part is maintained below the first temperature. The temperature may be maintained by a heat sink, a low-emissivity coating, a cooling device, or the like, or the positioning of a heat source such as a laser, furnace, or conductive coating. In one embodiment, the second region is maintained below the nucleation temperature of the glass part such that nucleation does not occur. In another embodiment, the temperature of the second region exceeds the nucleation temperature, so nucleation occurs, but at a slower rate and/or lesser density than nucleation in the first region. As a result, the first region may have a higher density of nucleation sites than the second region.

At operation 1206, the first region of the glass part is heated to a second temperature that is at or above the crystallization temperature of the glass part. The first region may be maintained at the second temperature for a period of time while crystallization occurs in the first region. During crystallization, crystals form and grow at nucleation sites within the first region, thereby converting the glass part to a glass-ceramic part. The crystals have an associated crystal density (e.g., crystals per volume). Each crystal also has an associated size, and a median or other average crystal size of a portion of the glass-ceramic part, such as the first region, may be determined. In one embodiment, nucleation occurs during the crystallization process as well, and crystal growth may occur at the new nucleation sites, thereby increasing the crystal density of the first region. As discussed above, crystal growth results in conversion of the glass part to a glass-ceramic part having different material properties than the glass part, such as increased hardness, strength, fracture toughness, elastic modulus, and the like. Depending on their size and/or density, crystals may also contribute to scattering of light, thereby creating a haze within the glass-ceramic part.

At operation 1208, the second region is maintained below the second temperature. As discussed above, the temperature may be maintained by a heat sink, a low-emissivity coating, a cooling device, or the like, or the positioning of a heat source such as a laser, furnace, or conductive coating. In one embodiment, the second region is maintained below the crystallization temperature of the glass part such that crystal growth does not occur (e.g., the crystal density is zero). In another embodiment, the temperature of the second region exceeds the crystallization temperature, so crystal growth may occur, but at a slower rate and/or lesser density than crystal growth in the first region. As a result, the first region may have a higher density of and larger median size of crystals than the second region.

In various embodiments, the glass-ceramic part may undergo further processing for preparation and installation in an electronic device. Further processing may include polishing, finishing, and the like. In one embodiment, a mask is applied to the first region to mask the haze in the glass. For example, a mask may be applied to the first region around a periphery of a display of an electronic device (e.g., at least partially surrounding the display) to conceal the haze. The mask may be formed from an ink (e.g., an opaque ink) applied to the glass. In another embodiment, the mask is a translucent or opaque film or other covering.

In various embodiments, the steps of method 1200 are performed in a different order or with more or fewer steps. In one embodiment, selective heating occurs at either the nucleation phase or the crystallization phase. For example, the first and second regions may be heated to the first temperature in operation 1202, operation 1204 would be eliminated from the process, and different rates of crystal growth would occur during operations 1206 and 1208. Alternatively, different nucleation may occur during operations 1202 and 1204, and then the first and second regions may be heated to the second temperature in operation 1206, and operation 1208 would be eliminated.

Figure 13:
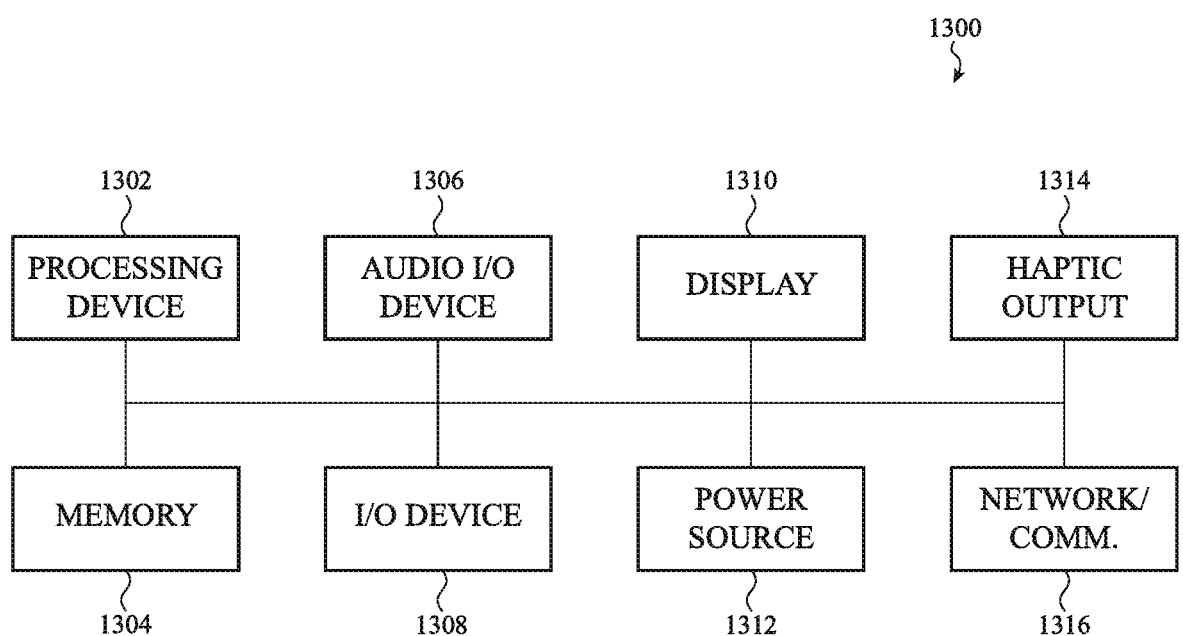
FIG. 13 is an illustrative block diagram of an electronic device that may incorporate a glass-ceramic part as described herein.

FIG. 13 is an illustrative block diagram 1300 of an electronic device that may incorporate a glass-ceramic part as described herein (e.g., electronic device 100). The electronic device can include a display 1310, one or more processing devices 1302, memory 1304, one or more audio input/output (I/O) devices 1306, one or more input/output (I/O) devices 1308, one or more haptic output devices 1314, a power source 1312, and a network communication interface 1316.

The display 1310 may provide an image or graphical output (e.g., computer-generated image data) for the electronic device. The display may also provide an input surface for one or more input devices, such as, for example, a touch sensing device and/or a fingerprint sensor. The display 1310 may be substantially any size and may be positioned substantially anywhere on the electronic device.

The processing device 1302 can control some or all of the operations of the electronic device. The processing device 1302 can communicate, either directly or indirectly, with substantially all of the components of the electronic device. For example, a system bus or signal line or other communication mechanisms (e.g., electronic connectors) can provide communication between the processing device(s) 1302, the memory 1304, the I/O device(s) 1306,1308, the display 1310, the power source 1312, the haptic output device(s) 1314, and/or the network communication interface 1316. The one or more processing devices 1302 can be implemented as any electronic device capable of processing, receiving, or transmitting data or instructions. For example, the processing device(s) 1302 can each be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the phrase "processing device" or, more generally, "processor" refers to a hardware-implemented data processing unit or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The memory 1304 can store electronic data that can be used by the electronic device. For example, a memory can store electrical data or content such as, for example, audio and video files, documents and applications, device settings and user preferences, timing signals, signals received from the one or more sensors, one or more pattern recognition algorithms, data structures or databases, and so on. The memory 1304 can be configured as any type of memory. By way of example only, the memory can be implemented as random access memory, read-only memory, Flash memory, removable memory, or other types of storage elements, or combinations of such devices.

The one or more I/O devices 1306, 1308 can transmit and/or receive data to and from a user or another electronic device. The I/O device(s) 1306, 1308 can include a display, a touch or force sensing input surface such as a trackpad, one or more buttons, one or more microphones or speakers, one or more ports such as a microphone port, one or more accelerometers for tap sensing, one or more optical sensors for proximity sensing, and/or a keyboard.

The power source 1312 can be implemented with any device capable of providing energy to the electronic device. For example, the power source 1312 can be one or more batteries or rechargeable batteries, or a connection cable that connects the electronic device to another power source such as a wall outlet.

The haptic output devices 1314 can facilitate production of haptic outputs (e.g., tactile outputs), for example using a haptic actuator. For example, an input surface may provide feedback in response to a sensed touch, to confirm an input, and so on.

The network communication interface 1316 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

It should be noted that FIG. 13 is for illustrative purposes only. In other examples, an electronic device may include fewer or more components than those shown in FIG. 13. Additionally or alternatively, the electronic device can be included in a system and one or more components shown in FIG. 13 are separate from the electronic device but included in the system. For example, an electronic device may be operatively connected to, or in communication with a separate display. As another example, one or more applications can be stored in a memory separate from the wearable electronic device. The processing unit in the electronic device can be operatively connected to and in communication with the separate display and/or memory.

Although many embodiments reference a selectively heat-treated glass-ceramic part in a portable electronic device (such as a cell phone or tablet computer) it may be appreciated that a selectively heat-treated glass-ceramic part can be incorporated into various electronic devices, mechanical devices, electromechanical devices and so on, including but not limited to: portable electronic devices (e.g., battery-powered, wirelessly powered devices, tethered devices, and so on); stationary electronic devices; control devices (e.g., home automation devices, industrial automation devices, aeronautical or terrestrial vehicle control devices, and so on); personal computing devices (e.g., cellular devices, tablet devices, laptop devices, desktop devices, and so on); wearable devices (e.g., implanted devices, wrist-worn devices, eyeglass devices, and so on); accessory devices (e.g., protective covers such as keyboard covers for tablet computers, stylus input devices, charging devices, and so on); and so on.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
a display;

a housing;

a cover sheet affixed to the housing and covering the display, the cover sheet comprising:

a first region having an optical haze and a first median crystal size;

a second region positioned over the display having a second median crystal size that is smaller than a crystal size that causes scattering of light; and a third region positioned between the first region and the second region, the third region defining a transition between the first region and the second region and including crystals that range in size from the first median crystal size to the second median crystal size, the transition having a gradient of crystal sizes between the first region and the second region, the gradient defining a uniform profile extending from a top surface of the cover sheet to a bottom surface of the cover sheet.

2. The electronic device of claim 1, further comprising:

a processor configured to provide information for presentation on the display;

a mask at least partially surrounding a periphery of the display; wherein:

the cover sheet is positioned adjacent to the display;

the first region is adjacent to the mask such that the mask conceals the optical haze; and the second region is adjacent to the display such that the information presented on the display is free of haze induced by the cover sheet.

3. The electronic device of claim 2, wherein the mask is formed from an opaque ink.

4. The electronic device of claim 1, wherein a strength of the first region is greater than a strength of the second region.

5. The electronic device of claim 1, further comprising at least one camera positioned adjacent to the second region of the display such that images captured by the at least one camera are free of haze induced by the cover sheet.

6. The electronic device of claim 1, wherein the cover sheet comprises an opening for at least one of a button or a speaker.

\* \* \* \* \*